Oct. 24, 1961 C. L. WELLINGTON 3,005,539
CONDENSER FINAL ASSEMBLY MACHINE
Filed March 30, 1956 4 Sheets-Sheet 1
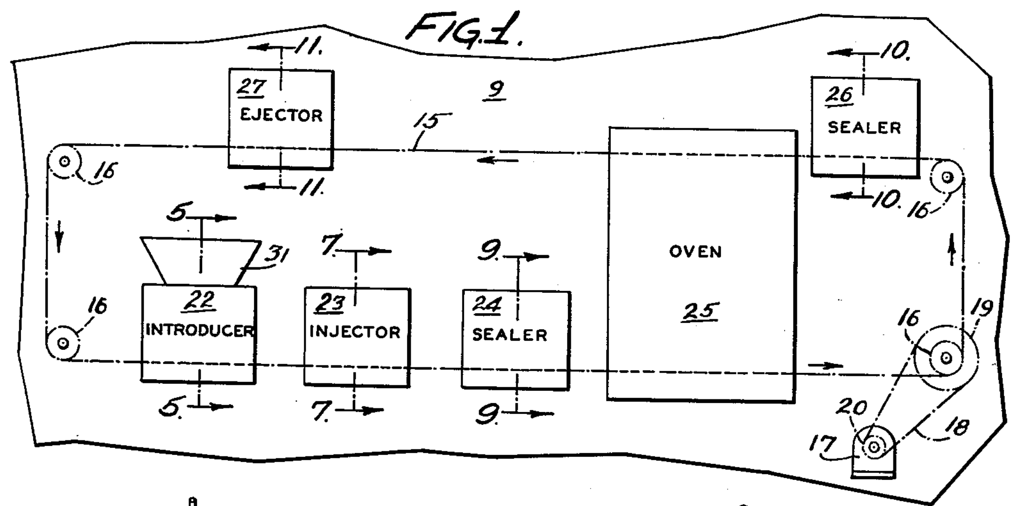
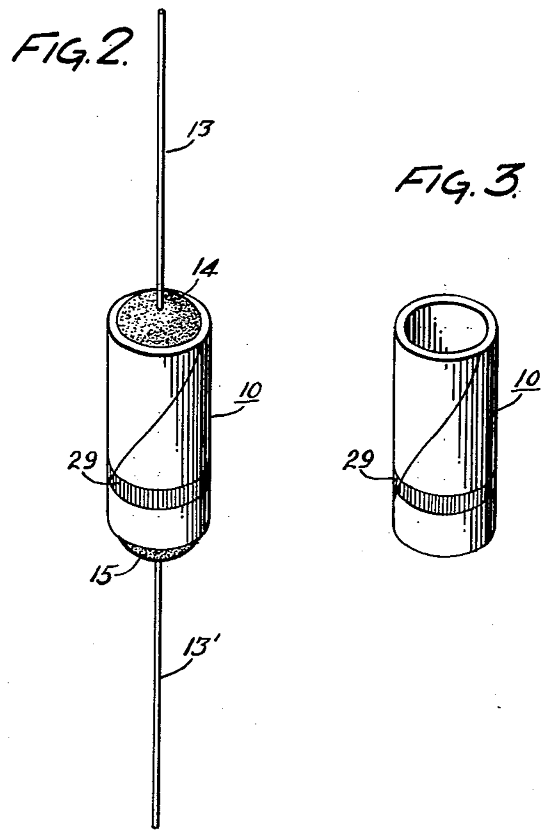
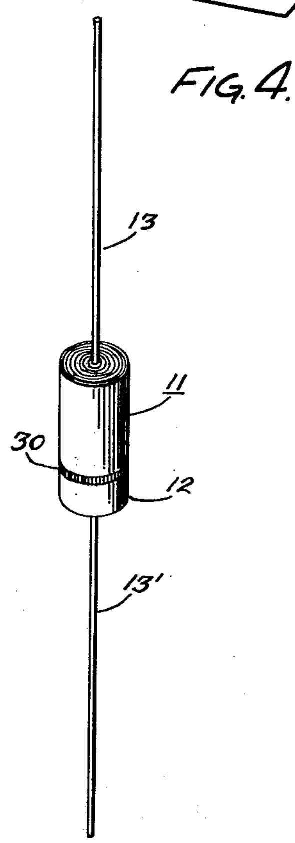
Inventor:
Cary L. Wellington
by Howson & Howson
Attys.

Oct. 24, 1961 C. L. WELLINGTON 3,005,539

CONDENSER FINAL ASSEMBLY MACHINE

Filed March 30, 1956 4 Sheets-Sheet 2

Inventor
Cary L. Wellington
by Howson & Howson Attys

Oct. 24, 1961 C. L. WELLINGTON 3,005,539
CONDENSER FINAL ASSEMBLY MACHINE
Filed March 30, 1956 4 Sheets-Sheet 3
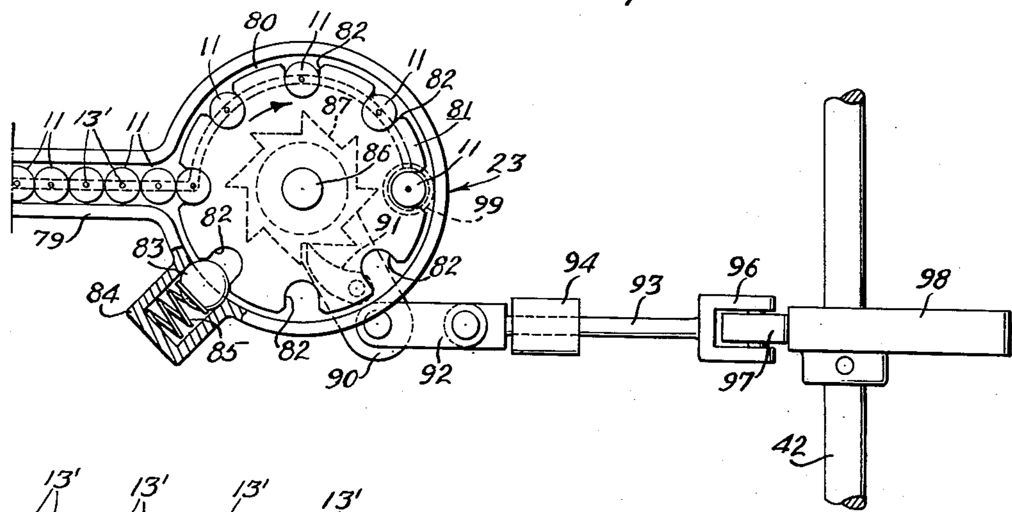
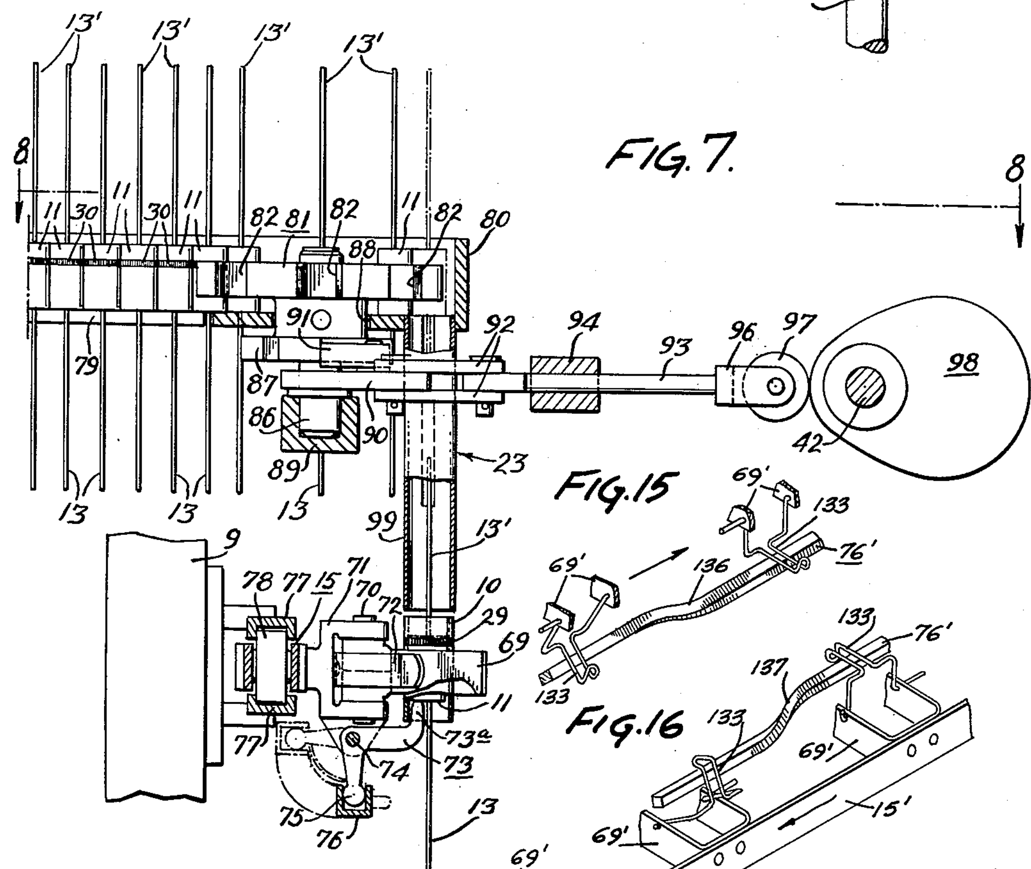
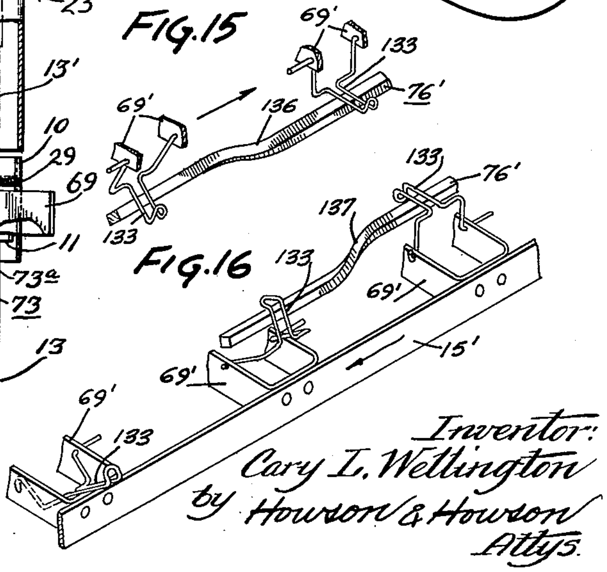
Inventor:
Cary L. Wellington
by Howson & Howson
Attys.

CONDENSER FINAL ASSEMBLY MACHINE
Filed March 30, 1956 4 Sheets-Sheet 4
FIG. 9.
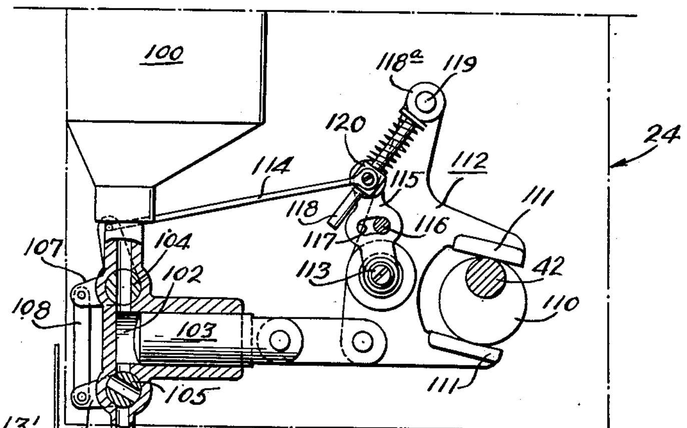
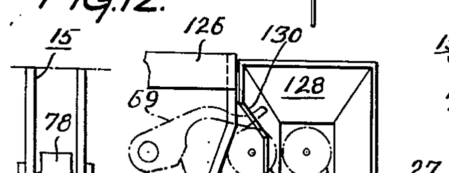
FIG. 10.
FIG. 12.
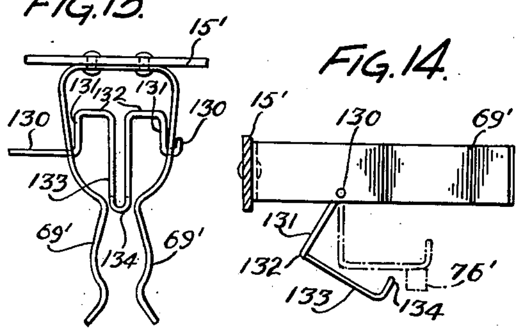
FIG. 13.
FIG. 14.
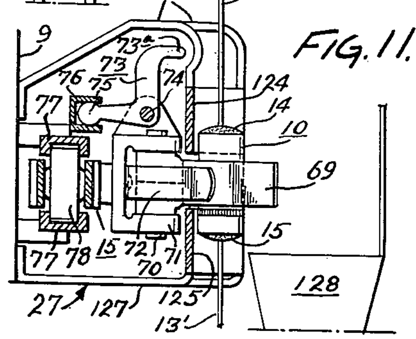
FIG. 11.
Inventor:
Cary L. Wellington
by Howson & Howson
Attys.

United States Patent Office 3,005,539

Patented Oct. 24, 1961

3,005,539

CONDENSER FINAL ASSEMBLY MACHINE

Cary L. Wellington, Stamford, Conn., assignor to Wellington Electronics, Inc., a corporation of New York Filed Mar. 30, 1956, Ser. No. 575,246
10 Claims. (Cl. 198—179)

This invention relates to a machine for finally assembling condensers which are composed of capacitor electrode assemblies sealed into a tubular casing. This invention also relates to the method of assembly of condensers of this type.

Heretofore, the assembly of condensers has been largely a hand operation. The procedure has been to place a condenser body within a tubular casing and squeeze sufficient sealing material into the opposite end of the casing. Commonly, the sealing material is a thermal-setting type so that in order to set or cure the sealing material and complete the condenser the condenser is heated to an oven.

The method of the present invention is capable of considerably reducing the time spent by relatively skilled people by placing the assembly of condensers either on a production line basis or making it fully or partially automatic. The machine of the present invention may be completely automatic subject to the supply of tubular casing, electrode assemblies and sealing material, or the amount of automation can be varied depending upon the needs of the particular assembly plant. When complete automation is employed, it is possible for one or two attendants to take the place of as many as thirty girls and to produce capacitors which are superior in both quality and appearance.

In its simplest form, the machine of the present invention consists of a moving endless conveyor supported on a frame and having supports for tubular condenser casings. This conveyor moves the casings past successive stations which may be tended by human attendants or automatic machinery and at which the capacitor electrode assembly is introduced into the casing and opposite ends of the casing are closed by sealing material which also holds the electrode assembly in place. The sealing material may be introduced into the ends of the tubular casing at successive stations or at a single station and the sealing material may be selected from a variety of materials which are either self-setting or thermal-setting. The thermal-setting materials require a heating station following a sealing station.

The method of the present invention contemplates moving tubular casing along a production line from one station to the next such that at the first station the capacitor body is introduced and at the next station sealing material is introduced. Additional stations may be added depending upon the nature of the particular method employed.

A novel device useful at the casing introducing station and forming part of the introducer is also independently useful. This device vertically orients generally cylindrical bodies by examining a marking on the body and if necessary acts to invert the body so that every body has the marking at the same end in their final positions. In the complete machine, the device orients all tubular casings so that the capacitor electrode assemblies which are all removed from the winding machine and packed with the same orientation will be fed into casings with the markings on the casings properly identifying the terminals of the capacitor.

The device for orienting the tubular bodies consists of means for feeding the tubular bodies each having a marking at one end at a time to an examination station where examination apparatus ascertains the presence or absence of a marking and signals which end is up. A free falling region below the examination station is provided below the examination station in which region the tube can turn 180° end over end, and a finger is provided to be alternatively movable into and out of the path of the free falling tubular body in response to the signal of the examination apparatus. A funnel is positioned to catch tubular bodies after they have made no more than a 180° turn about their short axis. If the finger intercepts the free falling body, it will cause the body to turn 180°, otherwise the body will remain vertical in its original position throughout its fall.

For a better understanding of the present invention, reference is made to the following drawings, in which:

FIG. 1 is a schematic representation of the machine of the present invention shown in a side elevational view;

FIG. 2 is a perspective view of a finished capacitor which has been assembled on the machine of FIG. 1;

FIG. 3 is a perspective view of the tubular outer casing of the condenser of FIG. 2;

FIG. 4 is a perspective view of the electrode assembly of the condenser of FIG. 2;

FIG. 7 is a side sectional view of the injector taken along line 7—7 of FIG. 1;

FIG. 8 is a plan view from above showing the injector as viewed from looking downward from line 8—8 of FIG. 7;

FIG. 9 is a side elevational view of the sealer partially in section taken along line 9—9 of FIG. 1;

FIG. 10 is a partial side elevational view of a sealer similar to that of FIG. 9 taken along line 10—10 of FIG. 1;

FIG. 11 is a side elevational view of the ejector taken along line 11—11 of FIG. 1;

FIG. 12 is a plan view from above of the structure shown in FIG. 11;

FIG. 13 is a plan view from above of a modified form of support and holder-closure assembly;

FIG. 14 is a side elevational view of the clip of FIG. 13 showing the holder-closure in a different position from that shown in FIG. 13;

FIG. 15 is a perspective view of a cam member preceding the rail which raises the holder-closure (FIGS. 13–14) into position; and FIG. 16 is a perspective view of a cam member adapted to move the holder-closure member away from engagement with the tubular condenser case after inversion.

Figure 5:
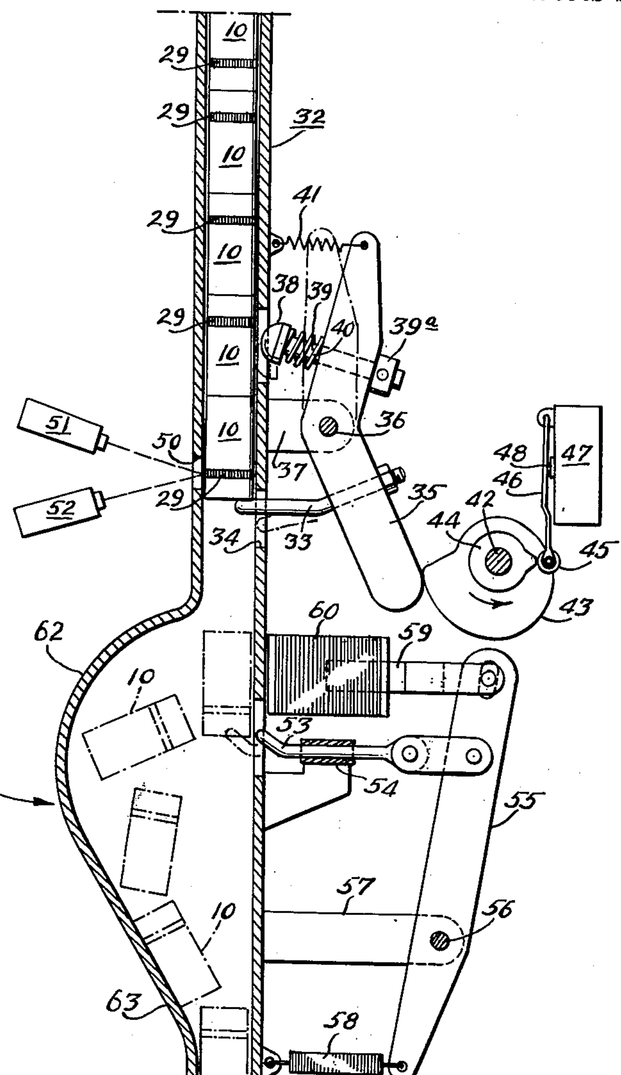
FIG. 5 is a side sectional view of the introducer taken along line 5—5 of FIG. 1.

Referring now to FIG. 2, the completed capacitor is shown. As can be seen from FIGS. 3 and 4, as well as FIG. 2, the capacitor is assembled from a tubular casing 10 preferably of generally cylindrical form which may be composed of paper, board or other suitable material. Within the casing 10 is placed the electrode assembly, generally designated 11, which preferably consists of a body of metallic strip electrodes separated by strip insulator material and wound together into a spiral package of generally cylindrical form. This cylindrical package 12 is completed by the terminal leads 13 and 13' which are conductively connected to their respective electrodes and which are preferably arranged to extend to opposite directions along the axis of the cylindrical package. Finally, the electrode assembly is held in place within the tubular body by sealing material 14 and 15 at the ends of the casing 10, which may be self-hardening or thermal setting.

I have discovered that final assembly of capacitors is simplified by moving the tubular casing through successive stations at which different operations occur. For example, at one station, the electrode assembly is inserted. At a later station, one end is sealed, and at a third station the other end is sealed. If a thermal-setting sealing material is employed, a separate station may be provided at which the sealing material is set by heat. It is possible to move the capacitor into this station after only one end has been sealed and then move it back into the station or into a similar station down the line after the other end has been sealed, or alternatively the condenser may be moved into a single heating station only after both ends have been sealed. Preferably the capacitor casing is kept vertical in the course of assembly so that the electrode assembly may be dropped vertically into the casing and so that the sealing material may be conveniently applied to one end using gravity and thermally set if appropriate and then the casing body may be inverted to apply sealing material to the other end in the same manner as in the first case.

In order to facilitate assembly of capacitors, I have devised a machine which facilitates the process just described. One form of this machine is shown in FIG. 1, but it will be understood, even though the machine shown in FIG. 1 is schematically represented, that the possibilities of the modification of the machine are great and many arrangements within the scope of the invention are possible.

In the machine of FIG. 1 a supporting frame 9 is provided for the conveyor 15. The conveyor may be a belt, a chain or any other type of conveyor adapted for this purpose. The conveyor is arranged to lie generally in a vertical plane and is provided with rotatable supports 16, one or more of which may be driven by a motor 17 mounted on support frame 9. Drive may be accomplished by a belt or chain 18 operated through pulleys or sprocket wheels 19 and 20, and the rotatable support 16 and the motor, respectively, or by any other suitable method. Supports, which will be described hereafter, are preferably provided at intervals along the conveyor to support the tubular casings 10 in a position with their axes vertical, when the conveyor is passing through those portions of the conveyor path where the conveyor runs horizontally. Arranged along the conveyor are various stations diagrammatically illustrated in FIG. 1 by boxes 22—27. Each of these stations may be manned by human beings or by machinery, which is preferably automatic, for accomplishing the particular intended end.

The first station is the introducer. At the introducer station, the casings 10 are fed to supports on the conveyor. The injector station, generally designated 23, follows the introducer station and, at this station, the electrode assemblies 11 are dropped into place within the tubular casing 10. The sealer assembly, at the station generally designated 24, applies sealing material to one end of the tubular casing. The oven at station 25 sets the sealing material applied at station 24. After the sealing material is set in one end, the casing is inverted and passes to station 26, at which another sealer applies sealing material to the other end of the tubular casing. The capacitor may then pass through oven 25 once again or through another oven, if preferred. The capacitor being finally assembled, the completed capacitor is ejected at station 27.

It will be recognized by those skilled in the art that, although people may be employed at the various stations to do the jobs described, it will be very much more efficient and the machine will function much more as a labor-saving device if each of the stations is equipped with an automatic mechanism. This is particularly true in the case of a large volume capacitor producer as opposed to a small volume capacitor producer. In some instances, it may be desirable to make some stations completely automatic and others manual. All such possibilities are intended to be within the scope of the present invention.

Figure 6:
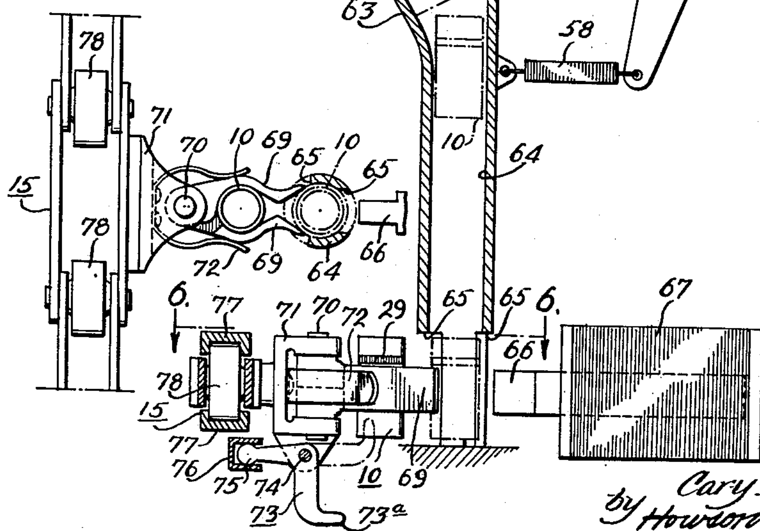
FIG. 6 is a plan view partially in section showing the support for the tubular casing and the feed taken along line 6—6 of FIG. 5.

In the completely automatic machine, the first stage, or introducer mechanism, may be of a type shown in FIGS. 5 and 6. Using this mechanism, the tubular casings 10 may be dumped in random batches into a hopper, generally designated 31 in FIG. 1. The hopper being funnel-shaped and being constantly jostled by a vibrator will direct tubes one at a time down tubular passage 32. At a selected level, a finger 33 projects through the tube wall through an opening 34 in the wall of the tubular passage 32 to block the downward movement of the tubular casings. By the nature of the device, a column of casings each supporting the one above it accumulates within tube 32. Finger 33 is mounted on a rocker arm 35 which is pivoted on pin 36 on a bracket 37 extending from the walls of the tubular passage 32. On the rocker arm on the far side of the pivot point 36 from the finger 33 a frictional stop member or tip is supported in position to pass through a hole in passage wall 32 at the level of the tubular casing next above the one supported by the finger 33. The frictional tip 38, which may be rubber or other suitable material, is supported on the sliding member 39 which passes slidably through rocker arm 35 and is terminated in a head 39*a* providing a shoulder which is urged against the rocker arm 35 by spring member 40 which extends between tip 38 and the other side of rocker arm 35 from head 39*a*. The spring 41 is connected between the wall of passage 32 and the rocker arm on the same side of the pivot as the frictional tip. Cam 43 on shaft 42 is positioned to bear against the rocker arm on the opposite side of the pivot from spring 41 and to oppose the urging of spring 41. In this manner, the frictional tip is just out of contact with the casing opposite it when the finger 33 is completely inserted, and is urged against the casing when the finger 33 is withdrawn to permit the lowest casing to drop. In the course of one cycle the cam 43 causes finger 33 to be removed and frictional tip 38 to engage one of the casings. After the casing supported by finger 33 drops, the finger 33 is urged inwardly in time to intercept the next casing as it is released by frictional tip 38. Tip 38 is easily slidable and spring 40 is light enough to prevent damage to any casing being supported. The shaft 42 may be driven by any desired means and that means may include motor 17 in other versions of the present device, but in the structure presently being described, this is not possible because the motor runs intermittently in response to the action of cam 44 also on cam shaft 42 which cam moves roller follower 45 and hence its supporting arm 46 about a pivot point on switch 47 to actuate switch plunger 48 which, when depressed, energizes the motor for a relatively short time, the period of energization being just sufficient to move the conveyor the distance between supports so that the next support is moved into the introducer station position.

In other versions of the present invention, the shaft 42 may be run by the motor and synchronized with the conveyor to cause the devices at the various stations to function at the appropriate time to be effective in the assembly of the condenser. For example, a chain running on a sprocket drive synchronized with the conveyor drive may drive the cam shaft 42. Although in such arrangement the conveyor moves continuously and hence somewhat complicates the structure and/or operation of some of the devices functioning in the assembly of the condensers, the advantage of having the moving parts of a machine continuously in motion frequently outweighs the advantage of having the conveyor stop momentarily at each station and then start up again after each stop.

As may be seen in FIGS. 2 and 3, a distinctive marking serving to distinguish one end of the capacitor from the other is preferably employed on the casings 10. This marking is preferably located at one end of the tubular casing. In this case, it is a black or color band which is selected because it is light absorbing in contrast to an otherwise light colored light reflecting casing wall. The band may serve to designate one of the electrodes of the condensers, such as, for example, the anode electrode. As seen in FIG. 4, a similar band 30 appears on the electrode assemblies in order to distinguish the anode from the cathode end, i.e., the end from which the cathode terminal extends. In assembling the electrode bodies within the casings 10, it is necessary to be consistent in keeping the bands 29 and 30 in the same position relative to each other in each condenser. The capacitor casings are frequently printed before the capacitor is assembled in order to designate which end is the anode and which end is the cathode as well as to specify the rating of the capacitor and any other pertinent information the manufacturer desires to include.

In the structure of FIG. 5, in order to insure that the casings all have the same vertical orientation, i.e., that the marked ends are either all up or all down according to the orientation of the electrode assemblies, an opening 50 is provided in the passage wall through which a beam from light source 51 is directed. A photosensitive element 52, such as a photoelectric cell, is positioned to examine the effect of light on the tubular casing. Photoelectric cell 52 acts as a switch in a circuit energizing solenoid 60 to produce proper vertical orientation of the casings.

Finger 53 is arranged to extend through the passage wall into the path of a free-falling casing in one of its extreme alternative positions. The finger 53 is slidably mounted on bracket 54 which is supported on the passage wall 32. The finger 53 is coupled to lever 55 which, in turn, is pivotally supported by pin 56 on bracket 57 also supported on the wall of tubular passage 32. A spring 58 is connected on the opposite side of pin 56 from the finger 53 between the lever arm 55 and an extension of the wall of the tubular passage 32 to urge the lever arm into the position shown wherein the finger 53 is withdrawn from the free-falling path of the casing. An iron core 59 supported on the end of the lever 55 on the same side of pivot 56 as finger 53 in order to cooperate with a solenoid 60 supported on the passage wall. Upon energization of solenoid 60, the core 59 is drawn inwardly and the lever is moved in opposition to the spring 58 causing the finger 53 to be urged into the path of a free-falling casing.

The circuit of solenoid 60 is coupled to the circuit of photocell 52 so that, if the black band appears in the path of the light from source 51, the light is absorbed and the reflected light is insufficient to actuate the photocell. Reflected light is ordinarily received at the photocell unless it is absorbed by a dark surface and, in this particular arrangement, the circuitry between the photocell is such that the solenoid is normally not energized but, when no light is reflected, it will be energized. This can be accomplished, for example, by using the signal from the photocell as a blocking voltage on the grid of a thyratron so that when the signal falls below the hold off potential of the grid, the tube will fire and continue to conduct until again blocked by grid voltage. Thus, the effect of no light reaching the photocell is to complete the circuit to the solenoid, drawing core 59 inward in opposition to the pull of spring 58, urging finger 53 into the free-falling path of the tubular casing 10. A bulge 62 is provided in the passage 32 of such dimensions that the casings intercepted by finger 53 may turn laterally about a diametrical axis being caught by funnel portion 63 after making a 180° turn and directed downward into a vertical column of casings within tubular passage 64. The control tube of the circuitry or the mechanical structure may provide sufficient delay in the removal of finger 53 so that it will not be withdrawn before the casing in its normal course of falling is intercepted. Thereafter, however, light will be reflected and cause the photocell to interrupt the circuit connecting the solenoid 60 to its power supply. Spring 58 will, therefore, urge the core 59 out of the solenoid and the finger 53 will be withdrawn in the position shown in FIG. 5. In the case of the tubular casing next above the one shown in FIG. 5 in position to be examined by the photocell, the solenoid will not be energized. As a consequence, the tubular casing will remain vertical in its fall directly downward and will not be turned. Thus, it will be seen that by the selective process made possible by the examination of each casing, all casings may be oriented in the proper vertical direction.

It will be obvious that examination can be conducted in a variety of other ways such as mechanically feeling slots or depressions in the casing, but the method described is preferred. In the arrangement described, the solenoid may be made responsive to reflection of light instead of its absorption. A variety of circuits of actuating the solenoid in response to signals from a photocell are well known and any suitable circuit may be used.

At the bottom of the passage 64, in its side walls are diametrically opposed openings 65. A ram 66 energized by a solenoid 67 shoves the casings laterally and into a support on the conveyor 15. The solenoid 67 may be connected to an energizing power supply for this purpose by closing a switch actuated by a cam on cam shaft 42, or by any other convenient means timed to act after the casing advances to the bottom of passage 64.

The particular support selected to carry casings on the conveyor in this instance may be seen in FIGS. 5, 6, 11 and 12. It consists of a pair of pivoted arms 69 joined by pin 70 extending between the parts of bifurcated bracket member 71 which embrace the pivoted end of arms 69. Spring members 72 are fixed to bracket 71 in position to urge arms 69 together at all times. Thus, as the ram 66 shoves a casing 10 laterally, the pressure causes the arms to open and accept the casing which is then held by spring pressure as the ram 66 is withdrawn. Each bracket 71 is preferably mounted directly on the conveyor, such as on one of the links of a chain conveyor.

Also supported on bracket 71 is a finger-like member 73 serving as a holder-closure supported on a bracket by pivot 74 which permits its rotation into position under the tubular casing in a position to hold an electrode assembly within the casing in proper position for sealing. A lever appendage 75 of the holder-closure member 73 operates to move the holder-closure 73 into whatever position is required at various points along the conveyor path by virtue of its cooperation with a guide in the form of a U-shaped track 76 which embraces the end of the appendage and moves it to determine the position of the holder-closure member. When the casing is rammed into the support the holder-closure member is preferably in the downward position shown in FIG. 6 in order to avoid interference with the insertion of the tubular casing. The conveyor path may be held within narrow limits against change and against pressures such as that of ram 66 by the use of channel-type tracks 77 which embrace oversized rollers 78 which connect adjacent links of chain conveyor 15.

In moving from station 22 to station 23 along the course shown in FIG. 1, the guide 76 takes a helical bend about an axis through successive pivot points 74 so that the holder-closure member 73 is moved into position beneath the tubular casing, partially closing one end of it. Thus, when the electrode assembly is dropped into the tubular casing, it cannot fall through. Preferably, the holder-closure member is provided with a tip 73*a* which extends into the casing to hold the electrode assembly away from the end in proper position for sealing. The holder-closure 73 does not completely close the end of the casing so that the wire terminal 13 may pass through the end of the casing without interference.

In the injector station 23, shown in FIGS. 7 and 8, the electrode assemblies are injected into the tubular casings. Although the orientation of the electrode assemblies is just as critical as that of the tubular casings, the nature of the assembly of the electrodes is such as to facilitate their arrangement into clips or magazines with their designating markings 30 all at one end. Therefore, there is no reason to employ a mechanism such as is employed at station 22 for inverting improperly oriented casings. A split guide channel 79 is mounted on frame 9 and supports the generally cylindrical electrode assemblies in a side by side relationship and proper vertical orientation. Channel 79 has a pair of parallel side walls and a bottom provided with a slot permitting the terminals 13 to pass through. The top is advantageously open for easy access to the electrode assemblies. Spring means may be provided to urge the electrode assemblies toward the circular track portion 80 of the electrode assembly guide, which is also supported on frame 9. This circular track portion has a circularly arranged vertical wall and a horizontal wall partially underlying the electrode assemblies but cut away to permit terminal leads 13 to pass through as they move in their circular path. Loosely fitting within the circular wall is a wheel 81 having peripherally arranged niches 82 each adapted to accept single electrode assemblies. A ball 83 having a diameter larger than the niches 82, and held in place by a radially projecting guide cup 84, under the pressure of spring 85 acts as a detent tending to hold the wheel 81 in a position in which the ball 83 partially enters one of the niches 82. Cup 84 is located so that when a niche lies opposite it, a niche also lies opposite the channel 79 so that an electrode assembly can easily enter each niche as it passes the channel.

The wheel 81 is preferably integral with a ratchet wheel 87 which lies beneath the bottom wall of the circular track 80, the ratchet 87 and the wheel 81 being connected by a hub which may be held in place on the shaft 86 by a set screw or other appropriate means. The opening 88 in the bottom of circular track 80 is of such a size that it snugly accepts the hub to provide something of a guiding bushing, but the rotating assembly is primarily rotatably supported in cup bearing 89 which snugly engages the bottom end of shaft 86 and which may be supported directly on the frame 9 or on some other part of the assembly. Mounted to rotate about the shaft 86 is lever arm 90 which supports a ratchet pawl or pallet 91 in such a manner with required pivotal support and spring biasing that it is able to drive the ratchet wheel 87. Connected to lever 90 by a suitable coupling element 92 is a drive rod 93 which is guided by bushing 94, which is supported, in turn, on the frame 9.

A bracket 96 at the remote end of the drive rod 93 supports follower wheel 97 which serves as a cam follower riding on cam 98 which is also mounted on the common cam shaft 42 in order to enable synchronization of the injector 23 with the introducer 22. One revolution of the cam shaft causes the cam to urge connecting rod 93 forward and hence causes lever 91 to drive ratchet wheel 87 forward one niche. Each time this occurs an open niche 82 appears opposite the supply channel 79 and a filled niche moves over the vertical passage provided by tube 99. The electrode assembly is guided down the length of tube 99 into the capacitor casing which, due to the positioning of injector station 23 on the conveyor, is directly beneath tube 99 held by a support on the conveyor.

After the capacitor electrode assembly has been injected into the casing 10 at injector station 23 and while the assembly is held in proper position for sealing by finger 73, the casing and electrode assembly as a unit advances (see FIG. 1) to the first sealer station 24 which is illustrated in FIG. 9. The sealing material may be kept in fluid or semi-fluid paste condition in a tank 100 in order to supply sealing material to a filling nozzle 101 and as it is advantageously sufficiently fluid that it may be easily handled in this manner. Between the supply 100 and the nozzle 101 is a pressure cylinder 102 in which moves a piston 103. In a line connecting the supply and the pressure cylinder is a valve 104 and in a line connecting the pressure cylinder and the nozzle is a valve 105. Valve 105 is arranged to be operated by a lever 106 and valve 104 is arranged to be operated by a crank 107. A connecting rod 108 connects lever 106 and one arm of crank 107 in such a manner that when valve 104 is open valve 105 must be closed, and vice versa.

As in the case of other elements, actuation of the sealer is advantageously accomplished by a cam 110 fixed to rotate with cam shaft 42 in order that the sealing operation may be synchronized with the other steps of final assembly. Cam 110 cooperates with cam followers 111 on an oscillating drive block 112 which is connected to piston 103. Drive block 112 rotates, or oscillates, about pin 113. A tie rod 114 connects the other arm of crank 107 to lever 115 which also rotates about pivot point 113 but also cooperates with a pin 116 in block 112 in such a manner that it has limited movement relative to block 112. This is preferably accomplished by use of a small slot 117 in lever 115 which engages the pin 116. A slide rod 118 has an eye 118*a* which engages a pin 119 which lies parallel to pin 116 and pivot pin 113 on block 112. Slide 120, which is rotatably supported on lever 115, slidably engages the rod 118, and a spring member extending between slide block 120 and eye 118*a* urges the block on lever 115 away from the pivot pin 119 into the position shown in FIG. 9. Thus, it will be seen that by appropriate kinematic arrangement, fluid which is gravity fed from the supply 100 through open valve 104 into cylinder 102 flows into the cylinder 102. Then, when valve 105 is open and valve 104 is closed, piston 103 moves to urge the sealing material out of cylinder 102, through nozzle 101 into the end of the tubular casing 10, which due to the position of station 24, and its synchronization with the conveyor applies the sealing material when the assembly on its support is directly beneath the nozzle.

After the sealing material has been applied, if it is the usual thermal-setting type, the assembly is moved still on the conveyor through an oven, as schematically shown in FIG. 1, in order to set the sealing material. If self-setting sealing material is employed, the oven station 25 may be eliminated, but, in any event, the conveyor continues on its horizontal course, keeping the assembly in vertical position until the sealing material is set. Thereafter, as will be seen in FIG. 1, the conveyor moves vertically upward and then horizontally toward the second sealer's station 26. By this movement of the conveyor, the support and the supported assembly is inverted, as shown in FIG. 10, so that sealing material may be injected into this end of the assembly through nozzle 101'. The sealer 26 is advantageously similar in all respects to the sealer at station 24. At some point during the movement of the conveyor after the sealing material first applied has been set, the guide 76, which follows the whole conveyor path, takes a helical turn in order to remove the holder-closure from the end of the casing so that free access is had by the nozzle 101' to fill the open end of the casing with sealing material. To complete the condenser, the assembly is advanced through a different part of the same sealing oven 25, or through a different oven, if desired, in order to set the sealing material.

As shown in FIGS. 11 and 12, the ejection of the completed condensers is easily accomplished by a cam-like ejector at station 27 in FIG. 1. Preferably, this cam-like ejector is composed of two vertically arranged coplanar surfaces 124 and 125. These members are arranged so that their effective surfaces at their leading edges are closer to the support structure 9 than the position of a casing supported on the conveyor but at their remote edges are further from the support structure 9 than the back surface of the supported condensers. Consequently, as the conveyor moves along carrying condensers on its supports, the ejector surfaces 124 and 125 have a camming action urging each finished condenser outwardly out of its supports, as shown in FIG. 12. The upper ejector surface 124 is supported by brackets 126 and the lower ejector surface is supported by brackets 127, all of which brackets are ultimately supported on supporting frame 9.

As the condensers are ejected from their supports, they are caught by a funnel 128, preferably provided with a deflection "backboard" to prevent overshooting as the condensers leave the spring-like supports 69. Part of the funnel is cut away at 130 in order to permit passage of the terminal lead 13'. The funnel 128 directs the condenser assemblies downward and into a collecting apparatus which may thereafter feed the condensers to automatic packing machinery for packing the condensers into a box, or the like.

It will be appreciated that the structures illustrated are primarily by way of example and not intended in any way to limit the scope of the claims. For example, the support structure illustrated, while it has many advantages, may be simplified considerably, as shown by the support structure of FIGS. 13 and 14. The support structure of FIGS. 13 and 14 is a U-shaped clip of spring metal having essentially parallel arms 69' which are preferably shaped to more easily hold condenser casings and a back portion which connects the arms and which is affixed directly to the conveyor 15'. The holder-closure assembly is formed simply from a piece of wire bent with various right angle bends to form a finger and having ends 130 which extend laterally through holes in the arms 69'. The wire is bent downwardly from portions 130 into parallel vertical portions 131, hence into colinear horizontal portions 132. Thence the wire is bent into parallel close spaced portions 133 which extend sufficiently far that they can underlie the casing. A tip consisting of short parallel upward extending portions joined together by portion 134 completes the structure, and this tip, like tip **73*a*, is intended to extend within the casing the distance from its end which the electrode assembly should be to act as a stop limiting the fall of an electrode assembly injected into a casing supported by support 69'**.

For use with the holder-closure member of FIGS. 13 and 14, a guide rail 76' which underlies the holder-closure member is advantageously provided. When the guide rail is not underlying the holder-closure, it will assume the position shown in FIG. 14 under the natural influence of gravity. As can be seen from FIG. 15, in order to urge the finger into proper position to underlie the casing, a generally helical rail segment 136 or cam surface is provided and begins behind the underside of the holder-closure finger portion 133. This cam raises the finger into the position shown dotted in FIG. 14 where it is held by a continuous rail 76'. When it is inverted, the holder-closure will tend to fall backward and rest against the conveyor and its construction should be such that its natural balance will end to cause it to fall away from a supported casing in this way. However, in order to move away from the casing any holder-closure members which fall the wrong way, as seen in FIG. 16, a cam surface 137 similar to the one preceding rail 76' may be provided to move the finger away from the casing before the sealer station 26 in order to make sure that the holder-closure is urged out of the way of the sealing material.

It will also be apparent that the devices at the various stations may be eliminated in favor of human attendants or other devices. On the other hand, these devices may have utility other than in combination with a conveyor of this invention. The conveyor itself may be modified in a great many ways. The method of the present invention of moving the tubular casings from station to station for assembly may be practiced in a variety of ways including the use of entirely different arrangements of conveyors from those shown. The present invention is accordingly capable of many manifestations all of which are intended to be within the scope and spirit of the present invention.

I claim:

1. A machine for assembling electrical condensers comprising a conveyor means movable along a predetermined path, supports on the conveyor means having means engaging and holding the sidewalls of the tubular condenser casings which are open at both ends, and separate holder closure means movably supported on each support and adapted to move to hold an electrode assembly in place within the casing.

2. The machine of claim 1 in which the supports each include generally parallel arms resiliently urged toward one another and adapted to frictionally engage the side walls of the tubular casing.

3. The machine of claim 2 in which the parallel arms are spring urged toward one another.

4. The machine of claim 3 in which the arms are rigid and pivoted to the support and the spring is connected to them to urge them together.

5. The machine of claim 2 in which the self-resilience of the parallel arms urges them together.

6. The machine of claim 1 in which the conveyor moves relative to a fixed frame, the holder-closure is pivoted to permit rotation into and out of operative position and is adapted to cooperate with a guide fixed on the frame to cooperate with the conveyor over at least part of the path of the conveyor, which guide holds the holder-closure in operative position at selected positions of the conveyor relative to the frame.

7. The machine of claim 6 in which the guide is a track adapted to engage an appendage on the pivoted holder-closure over at least part of the conveyor path.

8. The machine of claim 6 in which the guide is a rail positioned to hold the pivoted holder-closure in position beneath the casing during the insertion of the capacitor electrode assembly and the sealing of one end, and a cam surface on the frame precedes the rail in the normal direction of travel of the conveyor to urge the holder-closure into position to enable the rail to act upon it.

9. The machine of claim 8 in which a second cam surface is provided following the sealing to insure the removal of the holder-closure from its operative position when the casing is inverted.

10. The machine of claim 1 in which the support members are integral generally U-shaped brackets of resilient sheet metal, the arms of which are spaced apart a smaller distance than the diameter of the tubular casing and in which the holder-closure is a single piece of wire bent to form a finger at its middle having its end extending in opposite directions through the opposite legs of the U-shaped member to provide pivotal support of the finger, the support being such that the finger will normally be held by gravity away from the end of the casing but so that it may be rotated to underlie and partially close one end of the casing by the action upon it of a rail positioned adjacent the conveyor.

(References on following page)

References Cited in the file of this patent

UNITED STATES PATENTS

| | | |
|---|---|---|
| 1,470,781 | Thomas | Oct. 16, 1923 |
| 1,820,182 | Cooper | Aug. 25, 1931 |
| 1,854,453 | Cramer | Apr. 19, 1932 |
| 1,926,842 | Dubilier | Sept. 12, 1933 |
| 1,926,914 | Popov | Sept. 12, 1933 |
| 2,053,435 | Kimball et al. | Sept. 8, 1936 |
| 2,087,809 | Nichols | July 20, 1937 |
| 2,095,938 | Schmitt | Oct. 12, 1937 |
| 2,253,333 | Jaekel | Aug. 1, 1941 |
| 2,366,515 | Gladfelter et al. | Jan. 2, 1945 |
| 2,384,033 | Jacobson | Sept. 4, 1945 |
| 2,404,460 | Rolker | July 23, 1946 |
| 2,419,484 | Danziger | Apr. 22, 1947 |
| 2,429,496 | Sutter | Oct. 21, 1947 |
| 2,510,464 | Danziger | June 6, 1950 |
| 2,531,389 | Brandt | Nov. 28, 1950 |
| 2,572,312 | Burge et al. | Oct. 23, 1951 |
| 2,624,441 | Gapstur | Jan. 6, 1953 |
| 2,634,737 | Rowe | Apr. 14, 1953 |
| 2,662,626 | Graham et al. | Dec. 15, 1953 |
| 2,693,870 | Seward | Nov. 9, 1954 |